J. W. O'BRIEN.
CHEESE HOOP.
APPLICATION FILED AUG. 18, 1913.

1,090,166.

Patented Mar. 17, 1914.
2 SHEETS—SHEET 1.

WITNESSES

INVENTOR
J. W. O'BRIEN.

BY Fetherstonhaugh
ATT'YS

J. W. O'BRIEN.
CHEESE HOOP.
APPLICATION FILED AUG. 18, 1913.

1,090,166.

Patented Mar. 17, 1914.

2 SHEETS—SHEET 2.

WITNESSES

INVENTOR
J. W. O'BRIEN

BY Featherstonhaugh &

ATT'YS

UNITED STATES PATENT OFFICE.

JAMES WILLIAM O'BRIEN, OF WOLFE ISLAND, ONTARIO, CANADA.

CHEESE-HOOP.

1,090,166.  Specification of Letters Patent.  Patented Mar. 17, 1914.

Application filed August 18, 1913. Serial No. 785,388.

*To all whom it may concern:*

Be it known that I, JAMES WILLIAM O'BRIEN, a subject of the King of Great Britain, and resident of Wolfe Island, Province of Ontario, Dominion of Canada, have invented certain new and useful Improvements in Cheese-Hoops, of which the following is the specification.

The invention relates to improvements in cheese hoops and the objects of the invention are to provide an efficient, strong and easily operated cheese hoop which is inexpensive to manufacture and very convenient in operation.

It consists essentially in the novel construction and arrangement of parts more fully described in the following specification and the drawings which form part of the same.

Figure 1:
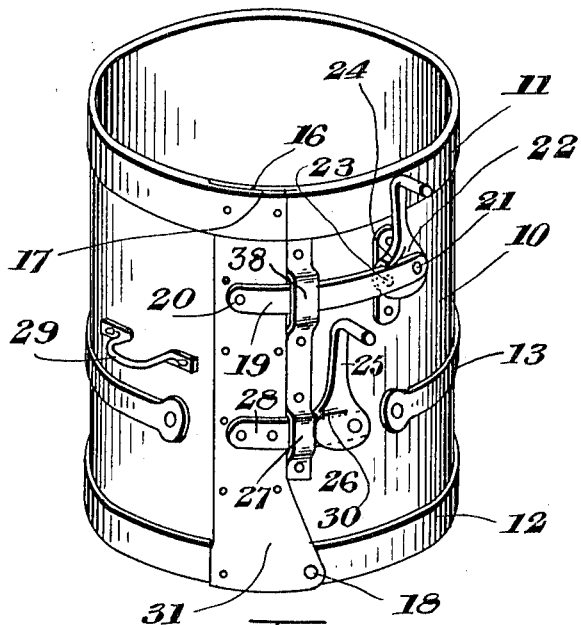
Figure 2:
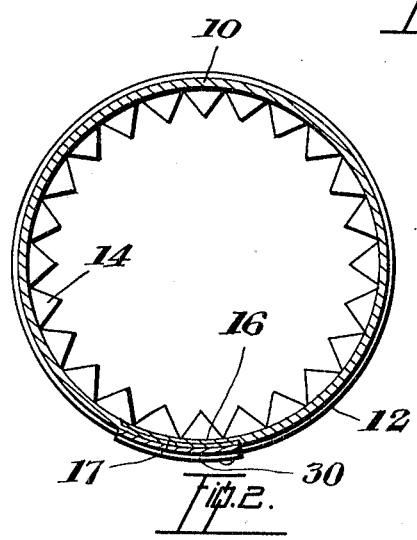
Figure 3:
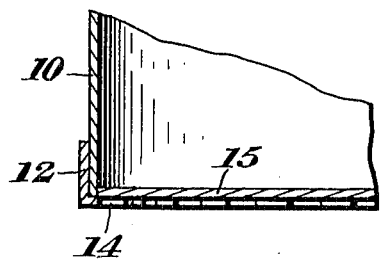
Figure 4:
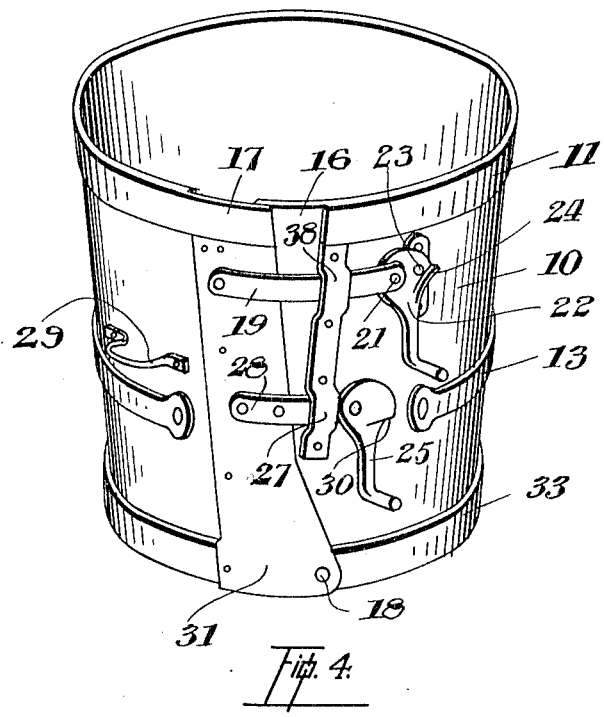
Figure 5:
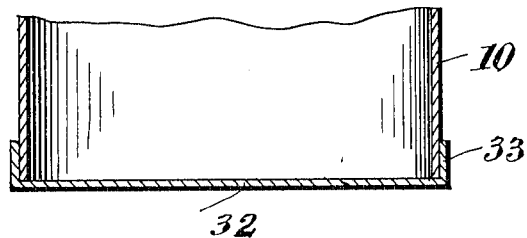

In the drawings, Figure 1 is a perspective view showing the arrangement of a hoop when closed, and the locking device for it. Fig. 2 is a plan in section taken across Fig. 1, indicating one method of construction for receiving a loose base piece or plate. Fig. 3 is a sectional elevation through the base of the hoop. Fig. 4 shows a perspective view of the hoop when open. Fig. 5 shows an alternate arrangement of securing the base member.

In the drawings like numerals of reference indicate corresponding parts in all the figures.

Referring to the drawings, 10 represents the cheese hoop body which is preferably made in one piece and provided with strengthening bands 11 and 12 respectively, around the top and bottom thereof, and an additional band 13 disposed approximately midway between the top and bottom. This band 13 is formed having its outside diameter equal to the diameter at the top of the hoop, thus providing an axially parallel seating for the hoop when in the cheese press, and preventing buckling of the hoops when assembled and under pressure.

The strengthening band 12 is preferably formed having an internally extending flange at the base which may be either solid or serrated, as shown by the numeral 14, for greater convenience in bending during manufacture, and is adapted to provide a seating for the bottom plate 15 which rests loosely thereon.

The cheese hoop is generally made slightly tapered so that the base of one hoop may enter into the top of the succeeding hoop and have a limited sliding motion therein, which it will be understood, is necessary when the hoops are assembled in a cheese press.

The main feature of the present invention is the construction and means of fastening of the hoop, which is to all intents and purposes one continuous strip having its ends 16 and 17 overlapping and pivotally secured at the base of the hoop only, by a pivot 18.

The top of the hoop is adapted to open to a limited extent by suitable mechanism. The mechanism I prefer to employ comprises a pivoted strip 19 secured by a pivot 20 to the end 17 of the hoop and at the other end having a pivot 21 extending into a double fulcrumed lever 22 whose other fulcrum 23 is secured to the side 16 of the hoop. The motion of this lever 22 is adapted either to close or open the top of the hoop between certain limitations. Further, I prefer to arrange this lever 22 with a heel 24 adapted to engage with the strip 19 when the fulcrums 21 and 23 are just past dead center in the closed position. An additional locking device is preferably secured farther down the hoop and consists of a lever 25 having an eccentric head 26 adapted to abut a suitable shoulder 27 formed on or secured to the end 16 of the strip of which the hoop is constructed. This lever is pivotally secured on a strap 28 which is fixedly secured to the end 17 of the hoop.

In the drawing I have illustrated a band 38 on the side 16 of the hoop through which these strips 19 and 28 pass, but it will be understood that I do not particularly limit myself to the forms of locking means herein disclosed as others might be suitable to perform the same functions, the main principle being that of the hoop being constructed of a band with overlapping ends and means for opening, closing and securing these ends in either open or closed position. Handles 29 preferably diametrically oppositely situated may be secured to the hoop. It is not intended that the hoop should ever actually come apart at its ends, and the only movement in opening is that governed by the lever 22 when the eccentric lever 25 has been released. I have found it preferable to form the lever 25 with a heel 30 similar to the heel 24 on the lever 22 adapted to engage with the strip 28 immediately after dead center.

In Fig. 5 is illustrated another arrangement and form of bottom, which I may prefer to use instead of the loose plate 15 resting on a solid or serrated flange 14 as shown in Figs. 2 and 3. According to this method, the bottom is formed in one piece 32, which is secured by an annular flange 33 extending vertically and engaging preferably with the outside 10 of the hoop, to which it is secured, so that to all intents and purposes the bottom is solid with the sides; except for a slit in the bottom plate which in practice has been found necessary, and is situated opposite the pivot 18.

With the particular construction shown here, that is having a strengthening strip 31 secured to the end 17 and extending vertically upward and being provided with a pivot 18, it is possible to dispense with the usual followers between succeeding hoops if the hoops are constructed with the bottom of one of a suitable size to almost engage with the opening in the succeeding hoop around the sides, as there are no marked projections whose presence would necessitate the use of followers. One of the several advantages which may be mentioned in connection with this construction of hoop is that the hoop automatically loosens itself from the cheese when being emptied without any of the usual difficulty of disengaging it from the hoop. Another advantage is that in bandaging the cheese, bands may be passed up and around the cheese without necessitating its removal from the hoop.

As many changes could be made in the above construction and many apparently widely different embodiments of my invention, constructed within the scope of the claims, without departing from the spirit or scope thereof, it is intended that all matter contained in the accompanying specification and drawings shall be interpreted as illustrative and not in a limiting sense.

What I claim as my invention is:—

1. A cheese hoop comprising a single strip of metal bent into the shape of a hollow truncated cone overlapping at its meeting ends and having on the inside of its smaller end a serrated internal radially extending flange adapted to receive and support the bottom plate, said overlapping ends being pivoted to one another adjacent the bottom.

2. A cheese hoop made of one strip of metal with overlapping ends pivotally connected together at their base, means for fastening the said ends, said means comprising eccentric levers, and a tying strip pivotally secured to a tightening lever.

3. A cheese hoop comprising a single strip of metal folded into a tapered circular band overlapping at its ends, said ends being pivotally secured one to the other at the base of the hoop.

4. A cheese hoop comprising a single strip of metal folded into a tapered circular band overlapping at its ends, said ends being pivotally secured one to the other at the base of the hoop, means for opening and closing the overlapping ends of said bands at the top of the hoop.

5. A cheese hoop comprising a single strip of metal folded into a tapered circular band overlapping at its ends, said ends being pivotally secured one to the other at the base of the hoop, means for opening and closing the overlapping ends of said bands at the top of the hoop, means for securing said overlapping ends in an open or closed position.

6. A cheese hoop comprising a single strip of metal folded into a tapered circular band, means of opening and closing said band; an additional band secured intermediate of the ends of said hoop, having an external diameter equal to the greatest diameter of the hoop, and adapted to prevent buckling of the hoop when under pressure in a cheese-press, by virtue of the parallel seating obtained from these equal diameters, in the cheese press.

7. A cheese hoop comprising a single strip of metal folded into a circular band having overlapping ends, a pivotal connection at the bottom of the hoop between said ends, a bottom member formed solid with said band and extending across the bottom thereof.

In witness whereof I have hereunto set my hand in the presence of two witnesses.

JAMES WILLIAM O'BRIEN.

Witnesses:
F. S. S. JOHNSON,
INA L. MILLER.

Copies of this patent may be obtained for five cents each, by addressing the "Commissioner of Patents, Washington, D. C."